(12) United States Patent
Lee et al.

(10) Patent No.: US 11,601,405 B2
(45) Date of Patent: Mar. 7, 2023

(54) METHOD FOR DECODING SECURE SOCKET LAYER FOR SECURITY OF PACKET TRANSMITTED IN PRESET OPERATING SYSTEM

(71) Applicant: SOOSAN INT CO., LTD., Seoul (KR)

(72) Inventors: Yong Hwan Lee, Seoul (KR); Woo Suk Yang, Daejeon (KR); Chui Woong Yang, Daejeon (KR)

(73) Assignee: SOOSAN INT CO., LTD., Seoul (KR)

( * ) Notice: Subject to any disclaimer, the term of this patent is extended or adjusted under 35 U.S.C. 154(b) by 345 days.

(21) Appl. No.: 16/975,520

(22) PCT Filed: Mar. 7, 2019

(86) PCT No.: PCT/KR2019/002629
§ 371 (c)(1),
(2) Date: Aug. 25, 2020

(87) PCT Pub. No.: WO2019/172663
PCT Pub. Date: Sep. 12, 2019

(65) Prior Publication Data
US 2021/0014202 A1 Jan. 14, 2021

(30) Foreign Application Priority Data

Mar. 9, 2018 (KR) .......................... 10-2018-0028267

(51) Int. Cl.
*H04L 29/06* (2006.01)
*H04L 9/40* (2022.01)
(Continued)

(52) U.S. Cl.
CPC ........ *H04L 63/0428* (2013.01); *H04L 47/286* (2013.01); *H04L 63/0236* (2013.01);
(Continued)

(58) Field of Classification Search
CPC ............ H04L 63/0428; H04L 63/0236; H04L 63/123; H04L 63/126; H04L 47/286; H04L 69/16
See application file for complete search history.

(56) References Cited

U.S. PATENT DOCUMENTS 8,578,002 B1 * 11/2013 Roesch ................. H04L 67/125
370/254
2015/0096009 A1 * 4/2015 Zoulias ............... H04L 63/0281
726/13
(Continued)

FOREIGN PATENT DOCUMENTS

KR 10-2009-0098542 A 9/2009
KR 10-2013-0024388 A 3/2013

*Primary Examiner* — Vance M Little
(74) *Attorney, Agent, or Firm* — Occhiuti & Rohlicek LLP

(57) ABSTRACT

Decoding includes sensing a packet related to SSL handshake for connecting a SSL between a client and a server after a TCP session has been established between the client and the server in an SSL decoding device. If the packet for an SSL handshake is transmitted in a preset operating system, an SSL between the client and the SSL decoding device and an SSL between the SSL decoding device and the server is established. A TCP session between a virtual client corresponding to the client and a virtual server corresponding to the server is also established. A packet transmitted/received between the virtual client and the virtual server is transmitted when the TCP session is established. If a first SSL packet transferred from the client to the SSL decoding device is received, the SSL packet is decoded and transmitted to the security device and to the server.

13 Claims, 8 Drawing Sheets

(51) Int. Cl.
*H04L 47/28* (2022.01)
*H04L 69/16* (2022.01)

(52) U.S. Cl.
CPC .......... *H04L 63/123* (2013.01); *H04L 63/126* (2013.01); *H04L 69/16* (2013.01)

(56) References Cited

U.S. PATENT DOCUMENTS

| | | |
|---|---|---|
| 2017/0093796 A1 | 3/2017 | Wang et al. |
| 2017/0093824 A1 | 3/2017 | Shulman et al. |
| 2018/0288062 A1* | 10/2018 | Goyal ................. H04L 63/0281 |

* cited by examiner

METHOD FOR DECODING SECURE SOCKET LAYER FOR SECURITY OF PACKET TRANSMITTED IN PRESET OPERATING SYSTEM

CROSS-REFERENCE TO RELATED APPLICATIONS

This application is a national phase under 35 U.S.C. 371 of International Application No. PCT/KR/2019/002629 filed on Mar. 7, 2019, which claims priority to Korean Application No. 10-2018-0028267 filed on Mar. 9, 2018, the contents of all of which are hereby incorporated by reference in their entireties.

TECHNICAL FIELD

Example embodiments relate to a method of decoding a secure socket layer (SSL) for security of a packet transmitted from a preset operating system (OS).

BACKGROUND ART

In an organization such as a company, numerous information may leak out through the Internet and be attacked by external networks.

To prevent such data leakage and external attacks, a company may inspect packets transmitted from terminals in the company and packets received from outside sources, and block some potentially risky connections.

However, when a website a terminal desires to access uses secure socket layer (SSL) communication, contents of packets transmitted/received may be encoded and then transmitted, and thus it may not be possible to verify whether there are data leakage or attacks.

To prevent this, companies have been employing an existing method of blocking communication with external sites that use the SSL communication to maintain the security.

However, such a method of blocking the external sites that use the SSL communication may decrease the work efficiency of employees of companies. Thus, there is a desire for a method of inspecting a packet transmitted through the SSL communication even in a security device, without simply blocking external sites that use the SSL communication.

DISCLOSURE OF INVENTION

Technical Goals

To solve the issues described above, an aspect provides a method of decoding a secure socket layer (SSL) packet and providing the decoded SSL packet to a security device by an SSL decoding device such that the security device inspects the SSL packet.

In detail, in a case in which a client operates in a preset operating system (OS), the SSL decoding device may establish a transmission control protocol (TCP) session between a virtual client and a virtual server and transmit, to the security device, a packet transmitted and received when establishing the TCP session between the virtual client and the virtual server. The SSL decoding device may intercept and decode an SSL packet transmitted and received between the client and a server, change the decoded SSL packet to a TCP packet between the virtual client and the virtual server, and then transmit the TCP packet to the security device. Thus, even the security device that is once unable to process an SSL packet may inspect encoded communication without any modification only by inspecting the received TCP packet.

Technical Solutions

According to an example embodiment, there is provided a secure socket layer (SSL) decoding method including detecting, by an SSL decoding device, a packet associated with an SSL handshake for an SSL connection between a client and a server after a transmission control protocol (TCP) session between the client and the server is established, verifying whether the packet associated with the SSL handshake is a packet transmitted from a preset operating system (OS), establishing an SSL between the client and the SSL decoding device and establishing an SSL between the SSL decoding device and the server when the packet associated with the SSL handshake is the packet transmitted from the preset OS, establishing a TCP session between a virtual client corresponding to the client and a virtual server corresponding to the server and transmitting, to a security device, a packet transmitted and received between the virtual client and the virtual server when establishing the TCP session, and when a first SSL packet transmitted from the client to the SSL decoding device is received, decoding the first SSL packet and transmitting the decoded first SSL packet to the security device, and re-encoding the decoded first SSL packet and transmitting the re-encoded first SSL packet to the server.

The verifying of whether the packet associated with the SSL handshake is the packet transmitted from the preset OS may include verifying information on a time-to-live (TTL) included in an Internet protocol (IP) header of the packet, and verifying an OS transmitting the packet as the preset OS when a value of the TTL is included in a preset range.

When the packet associated with the SSL handshake is not the packet transmitted from the preset OS, the SSL decoding method may further include bypassing the packet associated with the SSL handshake to be transmitted to the server such that an SSL between the client and the server is established with the SSL decoding device excluded, and bypassing an SSL packet transmitted and received between the client and the server from the SSL decoding device.

The decoding of the first SSL packet and the transmitting of the decoded first SSL packet to the security device, and the re-encoding of the decoded first SSL packet and the transmitting of the re-encoded first SSL packet to the server may include, when the first SSL packet transmitted from the client to the SSL decoding device is received, decoding the first SSL packet, generating a first TCP packet including a payload of the decoded first SSL packet and to be transmitted from the virtual client to the virtual server, transmitting the first TCP packet to the security device, generating a second SSL packet including the payload of the decoded first SSL packet, and transmitting the second SSL packet to the server.

When a third SSL packet transmitted from the server to the SSL decoding device is received, the SSL decoding method may further include decoding the third SSL packet and transmitting the decoded third SSL packet to the security device, and re-encoding the decoded third SSL packet and transmitting the re-encoded third SSL packet to the client.

The decoding of the third SSL packet and the transmitting of the decoded third SSL packet to the security device, and the re-encoding of the decoded third SSL packet and the transmitting of the re-encoded third SSL packet to the client may include, when the third SSL packet transmitted from the server to the SSL decoding device is received, decoding the third SSL packet, generating a second TCP packet including a payload of the decoded third packet and to be transmitted from the virtual server to the virtual client, transmitting the second TCP packet to the security device, generating a fourth SSL packet including the payload of the decoded third SSL packet, and transmitting the fourth SSL packet to the client.

When termination of the TCP session between the client and the server is detected by the SSL decoding device, the SSL decoding method may further include terminating the TCP session between the virtual client and the virtual server and transmitting, to the security device, a packet transmitted and received between the virtual client and the virtual server when terminating the TCP session.

When a request for transmission of a message from the security device to the client is received by the SSL decoding device, the SSL decoding method may further include generating a fifth SSL packet including the message and transmitting the fifth SSL packet to the client.

The request for the transmission from the security device to the client may be determined when a finish (FIN) packet including the message transmitted from the security device to the client is received, and a reset (RST) packet transmitted from the security device to the server is received.

The establishing of the TCP session between the virtual client corresponding to the client and the virtual server corresponding to the server, and the transmitting of the packet transmitted and received between the virtual client and the virtual server when establishing the TCP session to the security device may include matching and storing a 5-tuple of the virtual client corresponding to a 5-tuple of the client, and matching and storing a 5-tuple of the virtual server corresponding to a 5-tuple of the server.

According to another example embodiment, there is provided an SSL decoding method including detecting, by an SSL decoding device, a packet associated with a TCP handshake for establishing a TCP session between a client and a server, verifying whether the packet associated with the TCP handshake is a packet transmitted from a preset OS, when the packet associated with the TCP handshake is the packet transmitted from the preset OS, detecting a packet associated with an SSL handshake for an SSL connection between the client and the server after the TCP session between the client and the server is established, establishing an SSL between the client and the SSL decoding device and establishing an SSL between the SSL decoding device and the server, establishing a TCP session between a virtual client corresponding to the client and a virtual server corresponding to the server and transmitting, to a security device, a packet transmitted and received between the virtual client and the virtual server when establishing the TCP session, and when a first SSL packet transmitted from the client to the SSL decoding device is received, decoding the first SSL packet and transmitting the decoded first SSL packet to the security device, and re-encoding the decoded first SSL packet and transmitting the re-encoded first SSL packet to the server.

The verifying of whether the packet associated with the TCP handshake is the packet transmitted from the preset OS may include verifying information on a TTL included in an IP header of the packet, and verifying an OS transmitting the packet as the preset OS when a value of the TTL is included in a preset range.

When the packet associated with the TCP handshake is not the packet transmitted from the preset OS, the SSL decoding method may further include bypassing the packet associated with the TCP handshake to be transmitted to the server from the SSL decoding device, and bypassing a packet transmitted and received between the client and the server from the SSL decoding device.

Advantageous Effects

According to an example embodiment, there is provided a method of relaying secure socket layer (SSL) communication between a client and a server, decoding a packet, and transmitting the decoded packet to a security device. Through the method, an existing security device may receive a decoded SSL packet without any measure, and inspect security. In addition, by decoding the SSL communication only for a client that operates in a preset operating system (OS), it is possible to exclude the client from the inspection.

BEST MODE FOR CARRYING OUT THE INVENTION

Figure 1:
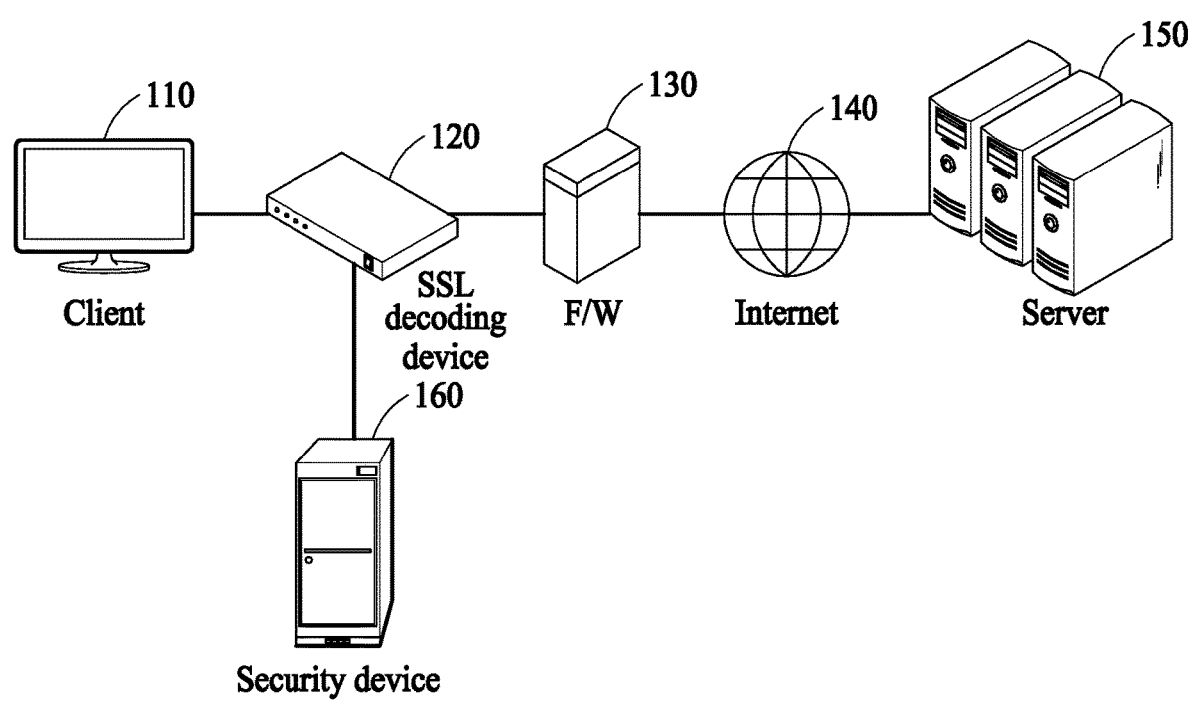
FIG. 1 is a diagram illustrating an example of a security system that inspects a packet in secure socket layer (SSL) communication according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Example embodiments to be described hereinafter relate to a method of decoding a secure socket layer (SSL) packet and providing the decoded SSL packet to an existing security device by an SSL decoding device such that the existing security device may inspect encoded traffic.

Hereinafter, an SSL decoding method for security in a security system will be described in detail with reference to FIGS. 1 through 8.

FIG. 1 is a diagram illustrating an example of a security system that inspects a packet in SSL communication according to an example embodiment.

Referring to FIG. 1, a security system includes an SSL decoding device and a security device.

A client 110 may be connected to a network, and there may be one or more clients, for example, terminals such as personal computers (PCs) and smartphones.

The SSL decoding device 120 may relay transmission control protocol (TCP) communication and SSP communication between the client 110 and a server 150. For a TCP packet, the SSL decoding device 120 may transmit the TCP packet to the security device 160 through mirroring. For an SSL packet, the SSL decoding device 120 may decode the SSL packet into a TCP packet and transmit the TCP packet to the security device 160.

The SSL decoding device 120 may establish in advance a TCP session between a virtual client and a virtual server such that the security device 160 processes in a conventional way the TCP packet obtained through the decoding, and may transmit a handshake packet transmitted and received when establishing the virtual TCP session to the security device 160.

The SSL decoding device 120 will be described in detail with reference to FIGS. 2 through 8.

The security device 160 may inspect data included in a received packet, as similar to what an existing security device operates, to check whether there is a content on which leakage is banned or there is a virus, and may transmit a message to the client 110 or receive a session control message for terminating a TCP session between the client 110 and the server 150.

When, in a network environment, a packet is transmitted from the client 110 to the server 150 through the Internet 140, the packet may be transmitted through a firewall 130.

An SSL decoding method for security in the security system which is embodied as described above will be described hereinafter with the accompanying drawings.

Figure 2:
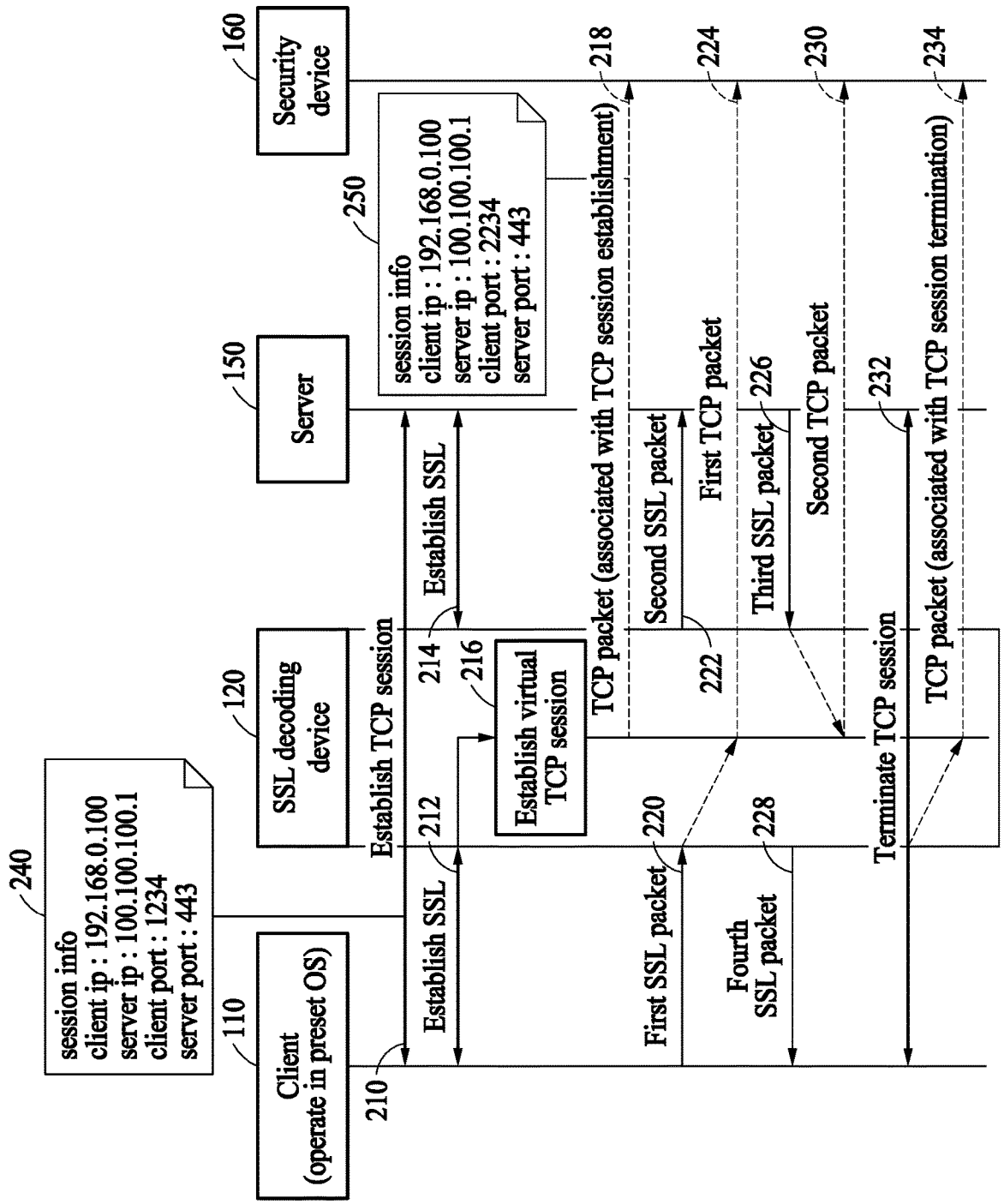
FIG. 2 is a diagram illustrating an example of how an SSL decoding device of a security system processes an SSL packet received from a preset operating system (OS) according to an example embodiment.

FIG. 2 is a diagram illustrating an example of how an SSL decoding device of a security system processes an SSL packet received from a preset operating system (OS) according to an example embodiment.

Referring to FIG. 2, in operation 210, the client 110 establishes a TCP session for communication with the server 150. The TCP session may be established through a 3-way handshake between the client 110 and the server 150.

The SSL decoding device 120 may be disposed between the client 110 and the server 150, and detect whether the TCP session is established through a packet transmitted and received.

When a packet (e.g., SSL Hello packet) associated with an SSL handshake for connecting an SSL between the client 110 and the server 150 is detected after the TCP session between the client 110 and the server 150 is established, the SSL decoding device 120 may verify whether the packet associated with the SSL handshake is a packet transmitted from a preset OS. As a result of the verifying, when the packet associated with the SSL handshake is the packet transmitted from the preset OS, the SSL decoding device 120 establishes an SSL between the client 110 and the SSL decoding device 120, without transmitting the packet associated with the SSL handshake to the server 150, in operation 212, and establishes an SSL between the SSL decoding device 120 and the server 150 in operation 214.

Here, the SSL may be established through an SSL handshake between the client 110 and the SSL decoding device 120, or between the SSL decoding device 120 and the server 150.

Although SSL handshaking is described with reference to FIG. 2, a portion of a process of the SSL handshaking may be selective and omitted. The SSL handshaking process is not limited to the SSL handshaking described above with reference to FIG. 2.

Figure 3:
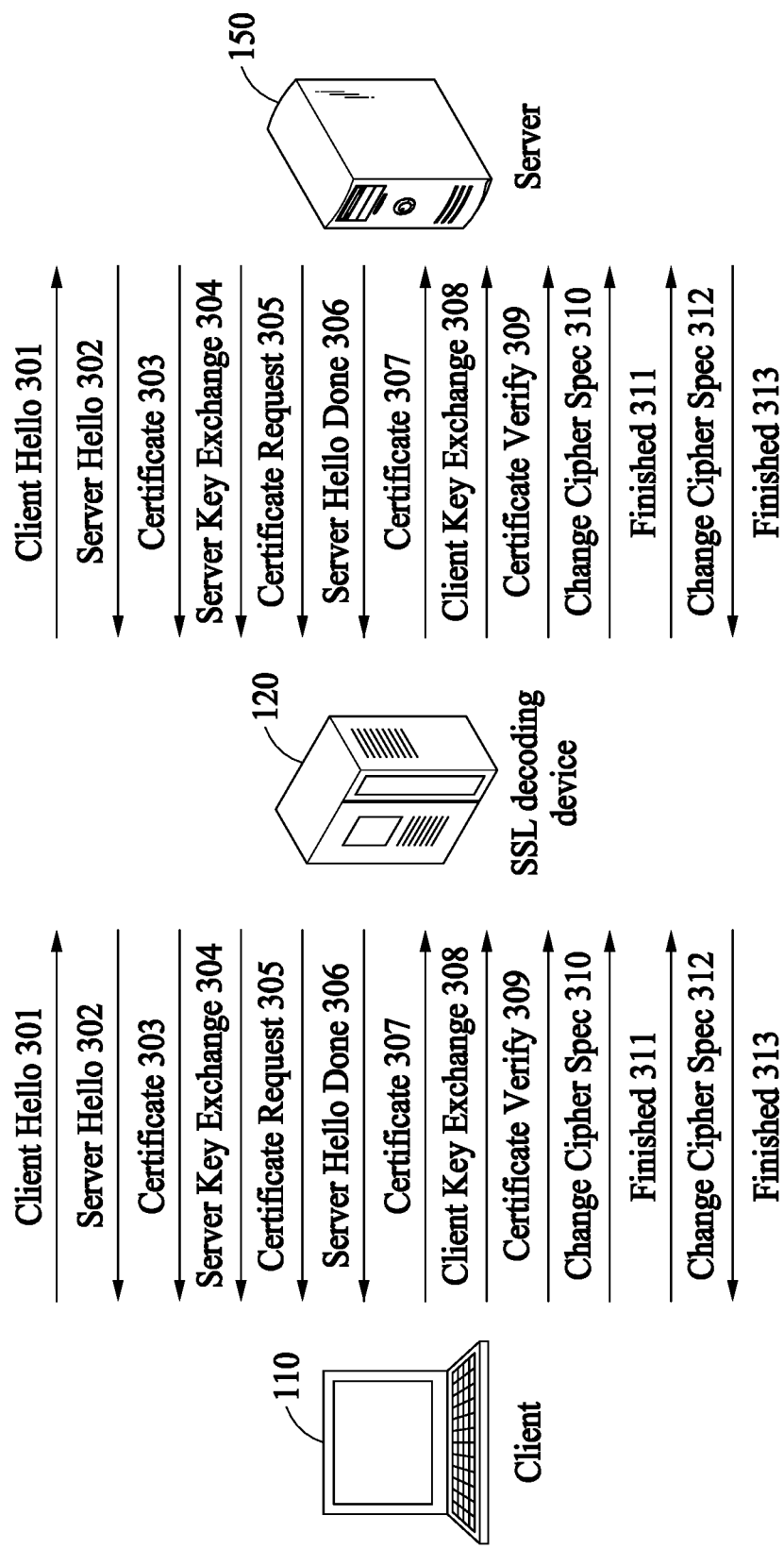
FIG. 3 is a diagram illustrating an example of an SSL handshake with a client or a server in an SSL decoding device of a security system according to an example embodiment.

FIG. 3 is a diagram illustrating an example of an SSL handshake with a client or a server in an SSL decoding device of a security system according to an example embodiment.

Referring to FIG. 3, the SSL decoding device 120 may be disposed between the client 110 and the server 150, and establish an SSL between the client 110 and the SSL decoding device 120 and establish an SSL between the SSL decoding device 120 and the server 150 when the client 110 establishes an SSL with the server 150.

That is, the SSL decoding device 120 may establish the SSL as a server when establishing the SSL with the client 110, and establish the SSL as a client when establishing the SSL with the server 150.

Referring to FIG. 3, Client Hello 310 may include version information of an SSL to be used by itself, a cipher suite list, and a client random number. Here, a cipher suite may include a symmetric key encryption system, a public key encryption system, and a hash function.

Sever Hello 302 may select an encryption method and include a server random number.

Server Certificate 303 may be a server-side certificate.

Server Key Exchange 304 may be a message transmitted when there is no certificate, or a certificate is used only for signature.

Certificate Request 305 may be a message transmitted to a client to request a certificate.

Server Hello Done 306 may be a message indicating that messages to be transmitted from a server to a client are all transmitted.

Client Certificate 307 may be a client-side certificate.

Client Key Exchange 308 may include a PMS symmetric encryption key, a 46-byte random number used to generate a message certification code, a code generated by a public key of a server, and others.

Certificate Verify 309 may be a message transmitted with a digital signature on such that a server readily verifies a certificate of a client. Through the message, the server may verify whether the public key of the certificate of the client is valid, and then terminate the certification of the client.

Change Cipher Spec 310 may be a message indicating that all messages to be transmitted subsequently from a client are encoded by an algorithm that is agreed with a server through a negotiation.

Finished 311 may be a message indicating that an SSL handshake is finished in a client.

Change Cipher Spec 312 may be a message indicating that all messages to be transmitted subsequently from a server are encoded by an algorithm that is agreed with a server through a negotiation.

Finished 313 may be a message indicating that an SSL handshake is finished in a server.

Referring back to FIG. 2, to verify whether the packet associated with the SSL handshake is the packet transmitted from the preset OS, the SSL decoding device 120 may verify information on a time to live (TTL) included in an Internet protocol (IP) header of the packet. When a value of the TTL is included in a preset range, the SSL decoding device 120 may determine that the client 110 transmitting the packet associated with the SSL handshake operates in the preset OS.

For example, when the OS is Windows, a TTL may decrease by 1 each time passing through a hop starting from 128.

In contrast, when the OS is Android or Linux, a TTL may decrease by 1 each time passing through a hop starting from 256 or 64.

In the case in which the OS is Windows, the SSL decoding device 120 may determine that, when the TTL included in the IP header of the received packet has a value from 65 to 128 (or a value from 106 to 127 and from 112 to 127 may be set), the OS is Windows, and then decode an SSL packet as described above.

In addition, the SSL decoding device 120 establishes a virtual TCP session between a virtual client corresponding to the client 110 and a virtual server corresponding to the server 150 in operation 216, and transmits, to the security device 160, a packet transmitted and received when establishing the TCP session between the virtual client and the virtual server in operation 218.

Here, the SSL decoding device 120 may match and store a 5-tuple of the virtual client corresponding to a 5-tuple of the client 110, and match and store a 5-tuple of the virtual server corresponding to a 5-tuple of the server 150, thereby searching for a corresponding device. The 5-tuple may include at least one of a source IP, a source port, a destination IP, a destination port, a TCP sequence number, or a TCP and/or user datagram protocol (UDP).

Subsequently, when the SSL decoding device 120 receives a first SSL packet transmitted from the client 110 to the SSL decoding device 120 in operation 220, the SSL decoding device 120 decodes the first SSL packet, generates a second SSL packet including a payload of the decoded first SSL packet, and transmits the generated second SSL packet to the server 150 in operation 222.

The SSL decoding device 120 generates a first TCP packet including the payload of the decoded first SSL packet and to be transmitted from the virtual client to the virtual server, and transmits the generated first TCP packet to the security device 160 in operation 224.

Subsequently, when the SSL decoding device 120 receives a third SSL packet transmitted from the server 150 to the SSL decoding device 120, the SSL decoding device 120 decodes the third SSL packet, generates a fourth SSL packet including a payload of the decoded third SSL packet, and transmits the generated fourth SSL packet to the client 110 in operation 228.

The SSL decoding device 120 generates a second TCP packet including the payload of the decoded third SSL packet and to be transmitted from the virtual server to the virtual client, and transmits the generated second TCP packet to the security device 160 in operation 230.

Subsequently, when the SSL decoding device 120 detects termination of the TCP session between the client 110 and the server 150 in operation 232, the SSL decoding device 120 terminates the TCP session between the virtual client and the virtual server, and transmits, to the security device 160, a packet transmitted and received when terminating the TCP session between the virtual client and the virtual server in operation 234. Here, the TCP session may be terminated through a 3-way handshake between the client 110 and the server 150.

Figure 4:
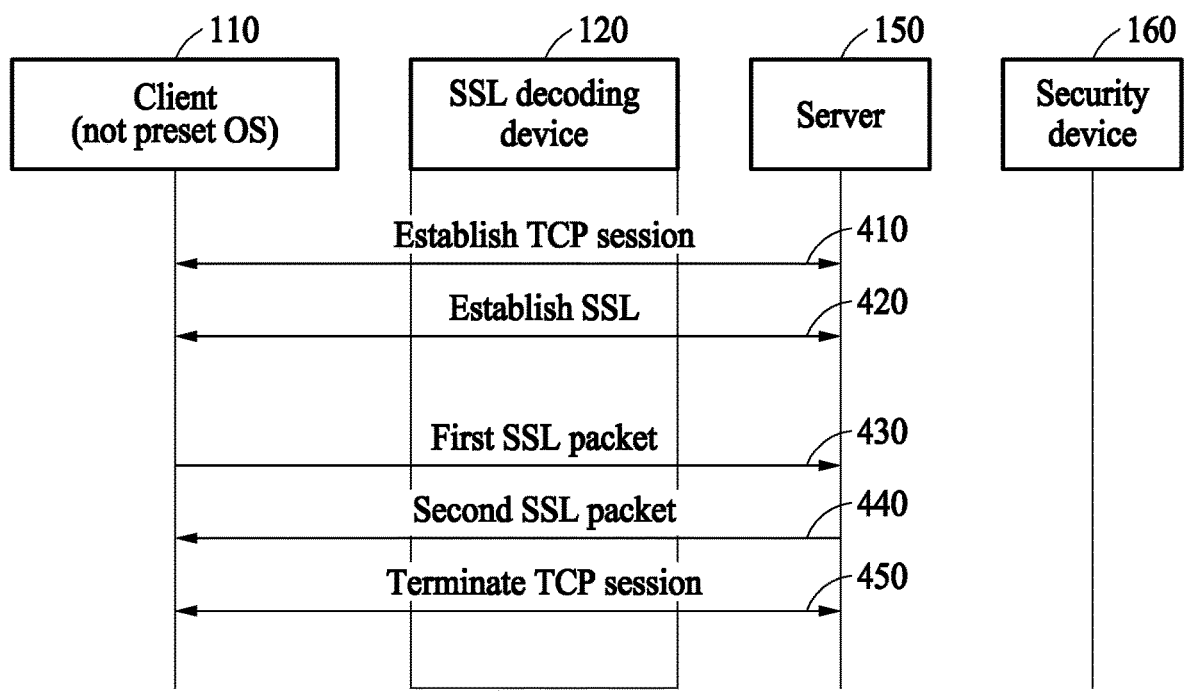
FIG. 4 is a diagram illustrating an example of how an SSL decoding device of a security system processes an SSL packet received from an OS that is not preset according to an example embodiment.

FIG. 4 is a diagram illustrating an example of how an SSL decoding device of a security system processes an SSL packet received from an OS that is not preset according to an example embodiment.

Referring to FIG. 4, the client 110 establishes a TCP session to communicate with the server 150 in operation 410. The TCP session may be established through a 3-way handshake between the client 110 and the server 150.

The SSL decoding device 120 may be disposed between the client 110 and the server 150, and detect whether the TCP session is established through a packet transmitted and received.

Here, when the SSL decoding device 120 detects a packet associated with an SSL handshake (e.g., an SSL Hello packet) for an SSL connection between the client 110 and the server 150 after the TCP session between the client 110 and the server 150 is established, the SSL decoding device 120 verifies whether the packet associated with the SSL handshake is a packet transmitted from a preset OS. When the packet associated with the SSL handshake is not the packet transmitted from the preset OS, operations for decoding an SSL packet that are described above with reference to FIG. 2 or 3 may not be performed. Instead, the SSL decoding device 120 bypasses the received packet to the server 150 such that an SSL between the client 110 and the server 150 is established in operation 420. Here, the SSL may be established through an SSL handshake between the client 110 and the server 150. The SSL may be established through the SSL handshake in the same way as described above with reference to FIG. 3.

In addition, when the SSL decoding device 120 detects an SSL packet transmitted from the client 110 to the server 150, the SSL decoding device 120 bypasses the SSL packet to the server 150 without decoding it in operation 430.

When the SSL decoding device 120 detects a second SSL packet transmitted from the server 150 to the client 110, the SSL decoding device 120 bypasses the SSL packet to the client 110 without decoding it in operation 440.

Subsequently, when the communication between the client 110 and the server 150 is completed, the client 110 or the server 150 terminates the TCP session in operation 450.

Here, the TCP session may be terminated through a 3-way handshake between the client 110 and the server 150.

Figure 5:
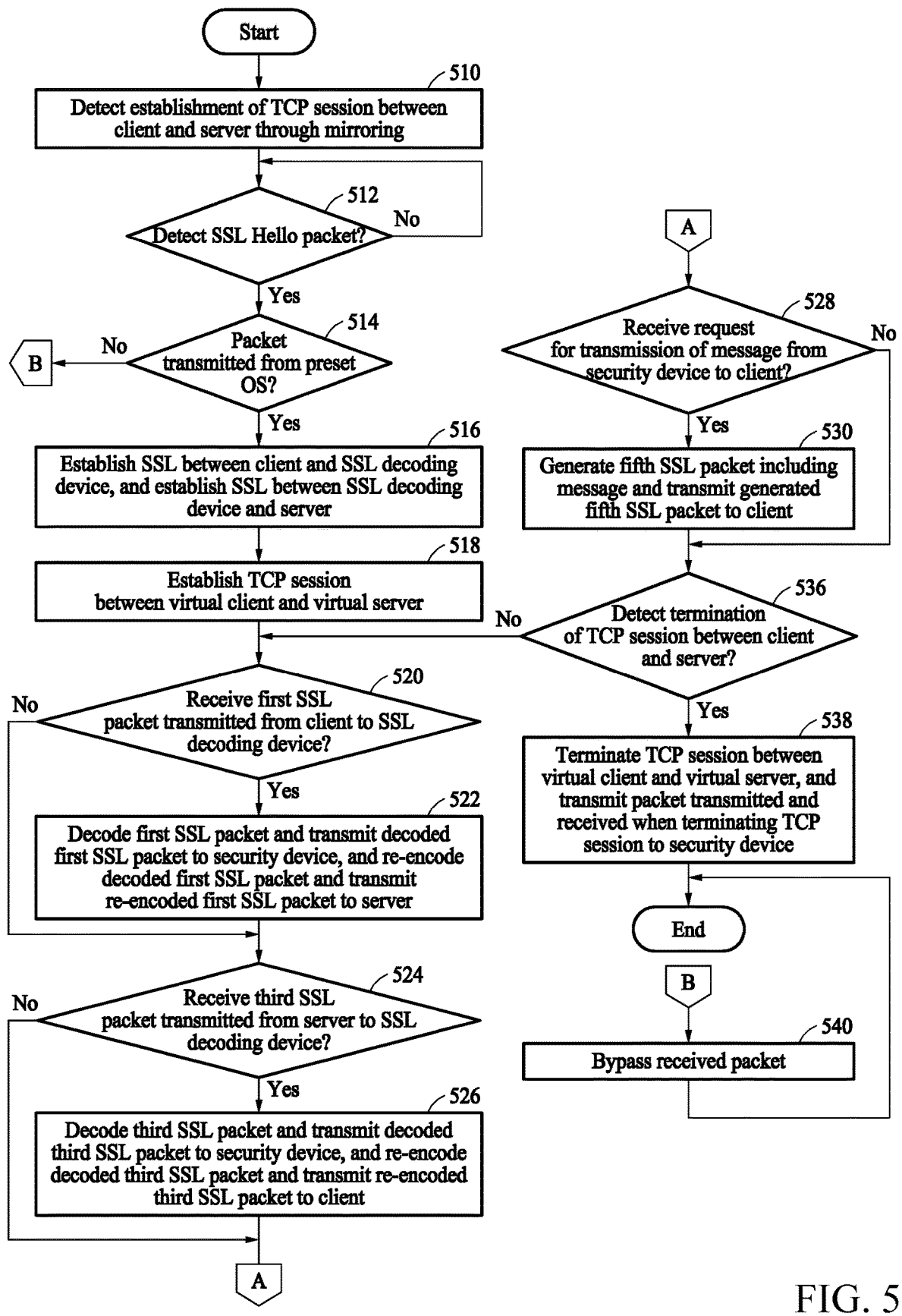
FIG. 5 is a flowchart illustrating an example of how an SSL decoding device processes an SSL packet according to an example embodiment.

FIG. 5 is a flowchart illustrating an example of how an SSL decoding device processes an SSL packet according to an example embodiment.

Referring to FIG. 5, in operation 510, the SSL decoding device 120 detects whether a TCP session between the client 110 and the server 150 is established or not by detecting a 3-way handshake for establishing the TCP session between the client 110 and the server 150.

In operation 512, the SSL decoding device 120 verifies whether a packet associated with an SSL handshake (e.g., an SSL Hello packet) for an SSL connection between the client 110 and the server 150 is detected after the TCP session between the client 110 and the server 150 is established.

In operation 514, when the packet associated with the SSL handshake is detected as the result of the verifying in operation 512, the SSL decoding device 120 verifies whether the packet associated with the SSL handshake is a packet transmitted from a preset OS.

Here, to verify whether the packet associated with the SSL handshake is the packet transmitted from the preset OS, the SSL decoding device 120 may verify information on a TTL included in an IP header of the packet. When a value of the TTL is included in a preset range, the SSL decoding device 120 may determine that the client 110 transmitting the packet associated with the SSL handshake operates in the preset OS. For example, in a case in which the OS is Windows, a TTL may decrease by 1 each time passing through a hop starting from 128. In contrast, in a case in which the OS is Android or Linux, a TTL may decrease by 1 each time passing through a hop starting from 256 or 64. In the case in which the OS is Windows, the SSL decoding device 120 may determine that, when the TTL included in the IP header of the received packet has a value from 65 to 128 (or a value from 106 to 127 and from 112 to 127 may be set), the OS is Windows, and then may decode an SSL packet as described above.

In operation 516, when the packet associated with the SSL handshake is the packet transmitted from the preset OS as the result of the verifying in operation 514, the SSL decoding device 120 establishes an SSL with the client 110 and establishes an SSL with the server 150. Here, the SSL may be established through the SSL handshake in the same way as described above with reference to FIG. 3.

In operation 516, the SSL decoding device 120 establishes the SSL between the client 110 and the SSL decoding device 120, and establishes the SSL between the SSL decoding device 120 and the server 150.

In operation 518, the SSL decoding device 120 establishes a TCP session between a virtual client corresponding to the client 110 and a virtual server corresponding to the server 150, and transmits a packet transmitted and received when establishing the TCP session between the virtual client and the virtual server to the security device 160.

Here, the SSL decoding device 120 may match and store a 5-tuple of the virtual client corresponding to a 5-tuple of the client 110, and match and store a 5-tuple of the virtual server corresponding to a 5-tuple of the server 150, thereby searching for a corresponding device.

In operation 520, the SSL decoding device 120 verifies whether a first SSL packet transmitted from the client 110 to the SSL decoding device 120 is received. In operation 522, when the first SSL packet is received as the result of the verifying in operation 520, the SSL decoding device 120 decodes the first SSL packet and transmits the decoded first SSL packet to the security device 160, and re-encodes the decoded first SSL packet and transmits the re-encoded first SSL packet to the server 150. Subsequently, the SSL decoding device 120 performs operation 524.

In operation 524, when the first SSL packet is not received as the result of the verifying in operation 520, the SSL decoding device 120 verifies whether a third SSL packet transmitted from the server 150 to the SSL decoding device 120 is received.

In operation 526, when the third SSL packet is received as the result of the verifying in operation 524, the SSL decoding device 120 decodes the third SSL packet and transmits the decoded third SSL packet to the security device 160, and re-encodes the decoded third SSL packet and transmits the re-encoded third SSL packet to the client 110. Subsequently, the SSL decoding device 120 may perform operation 528.

In operation 528, when the third SSL packet is not received as the result of the verifying in operation 524, the SSL decoding device 120 verifies whether a request for transmission of a message from the security device 160 to the client 110 is received.

In operation 530, when the request for the transmission of the message from the security device 160 to the client 110 is received as the result of the verifying in operation 528, the SSL decoding device 120 generates a fifth SSL packet including the message and transmits the fifth SSL packet to the client 110. Subsequently, the SSL decoding device 120 may perform operation 536.

In operation 536, when the request for the transmission of the message from the security device 160 to the client 110 is not received as the result of the verifying in operation 528, the SSL decoding device 120 verifies whether termination of the TCP session between the client 110 and the server 150 is detected.

When the termination of the TCP session between the client 110 and the server 150 is not detected as the result of the verifying in operation 536, the SSL decoding device 120 may return to operation 520 and then perform repeatedly the subsequent operations.

In operation 538, when the termination of the TCP session between the client 110 and the server 150 is detected as the result of the verifying in operation 536, the SSL decoding device 120 terminates the TCP session between the virtual client and the virtual server, and transmits a packet transmitted and received when terminating the TCP session to the security device 160.

In operation 540, when the packet associated with the SSL handshake is not the packet transmitted from the preset OS as the result of the verifying in operation 514, the SSL decoding device 120 bypasses an SSL packet received from the client 110 to allow the SSL packet to be transmitted to the server 150.

Figure 6:
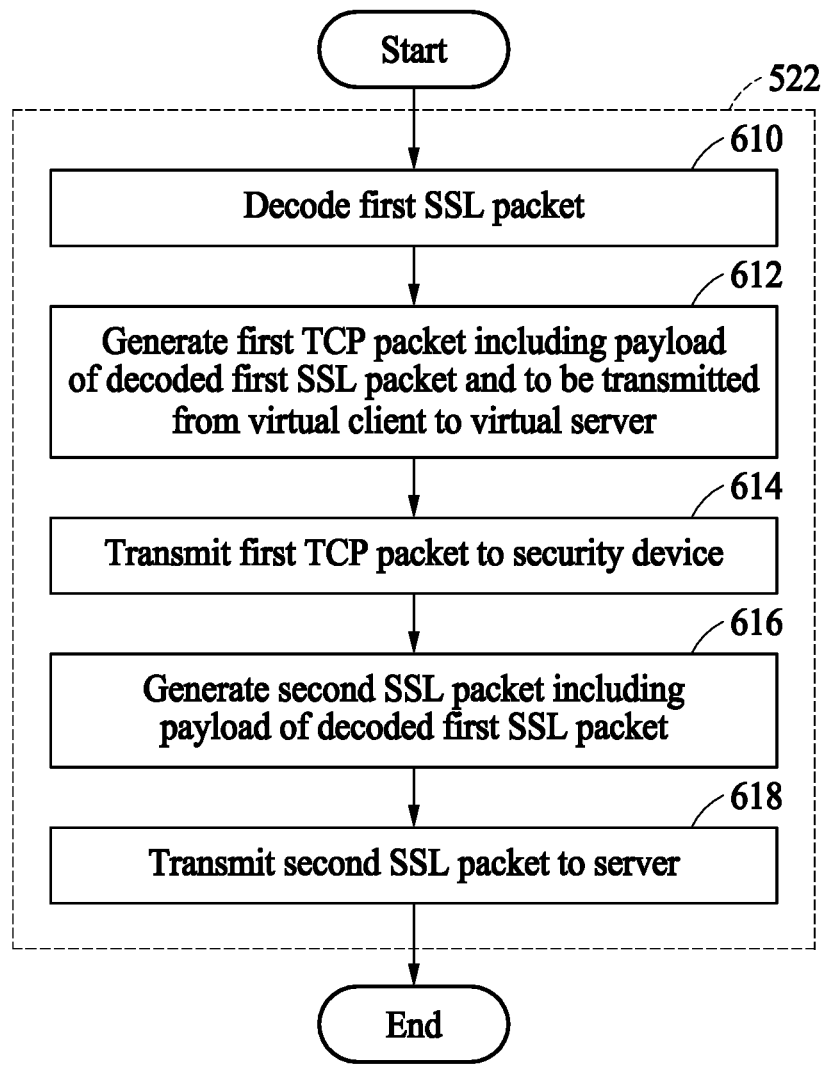
FIG. 6 is a flowchart illustrating an example of how an SSL decoding device processes an SSL packet transmitted from a client according to an example embodiment.

FIG. 6 is a flowchart illustrating an example of how an SSL decoding device processes an SSL packet transmitted from a client according to an example embodiment. Hereinafter, operation 522 described above with reference to FIG. 5 will be described in detail with reference to FIG. 6.

Referring to FIG. 6, in operation 610, the SSL decoding device 120 decodes a first SSL packet.

In operation 612, the SSL decoding device 120 generates a first TCP packet including a payload of the decoded first SSL packet and to be transmitted from the virtual client to the virtual server.

In operation 614, the SSL decoding device 120 transmits the first TCP packet to the security device 160.

In operation 616, the SSL decoding device 120 generates a second SSL packet including the payload of the decoded SSL packet.

In operation 618, the SSL decoding device 120 transmits the second SSL packet to the server 150.

Figure 7:
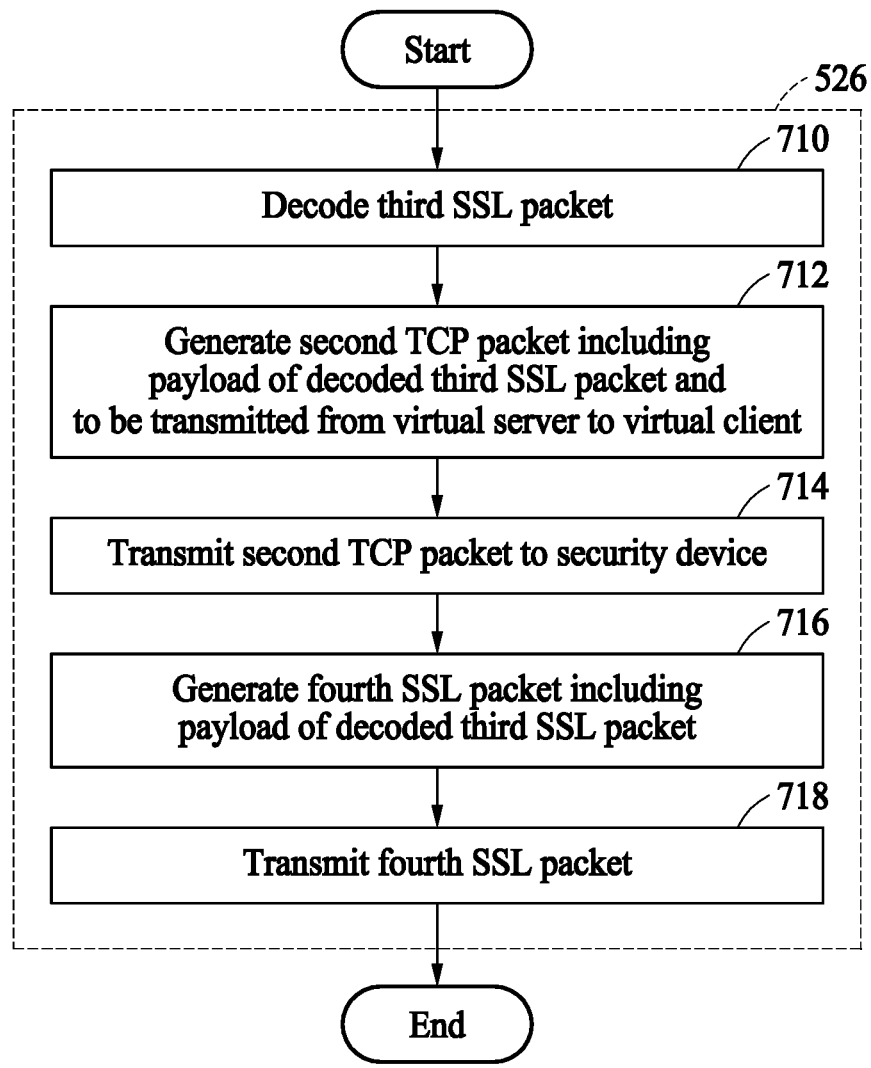
FIG. 7 is a flowchart illustrating an example of how an SSL decoding device processes an SSL packet transmitted from a server according to an example embodiment.

FIG. 7 is a flowchart illustrating an example of how an SSL decoding device processes an SSL packet transmitted from a server according to an example embodiment.

Hereinafter, operation 526 described above with reference to FIG. 7 will be described in detail with reference to FIG. 7. Referring to FIG. 7, in operation 710, the SSL decoding device 120 decodes a third SSL packet.

In operation 712, the SSL decoding device 120 generates a second TCP packet including a payload of the decoded third SSL packet and to be transmitted from the virtual server to the virtual client.

In operation 714, the SSL decoding device 120 transmits the second TCP packet to the security device 160.

In operation 716, the SSL decoding device 120 generates a fourth SSL packet including the payload of the decoded third SSL packet.

In operation 718, the SSL decoding device 120 transmits the fourth SSL packet to the client 110.

Figure 8:
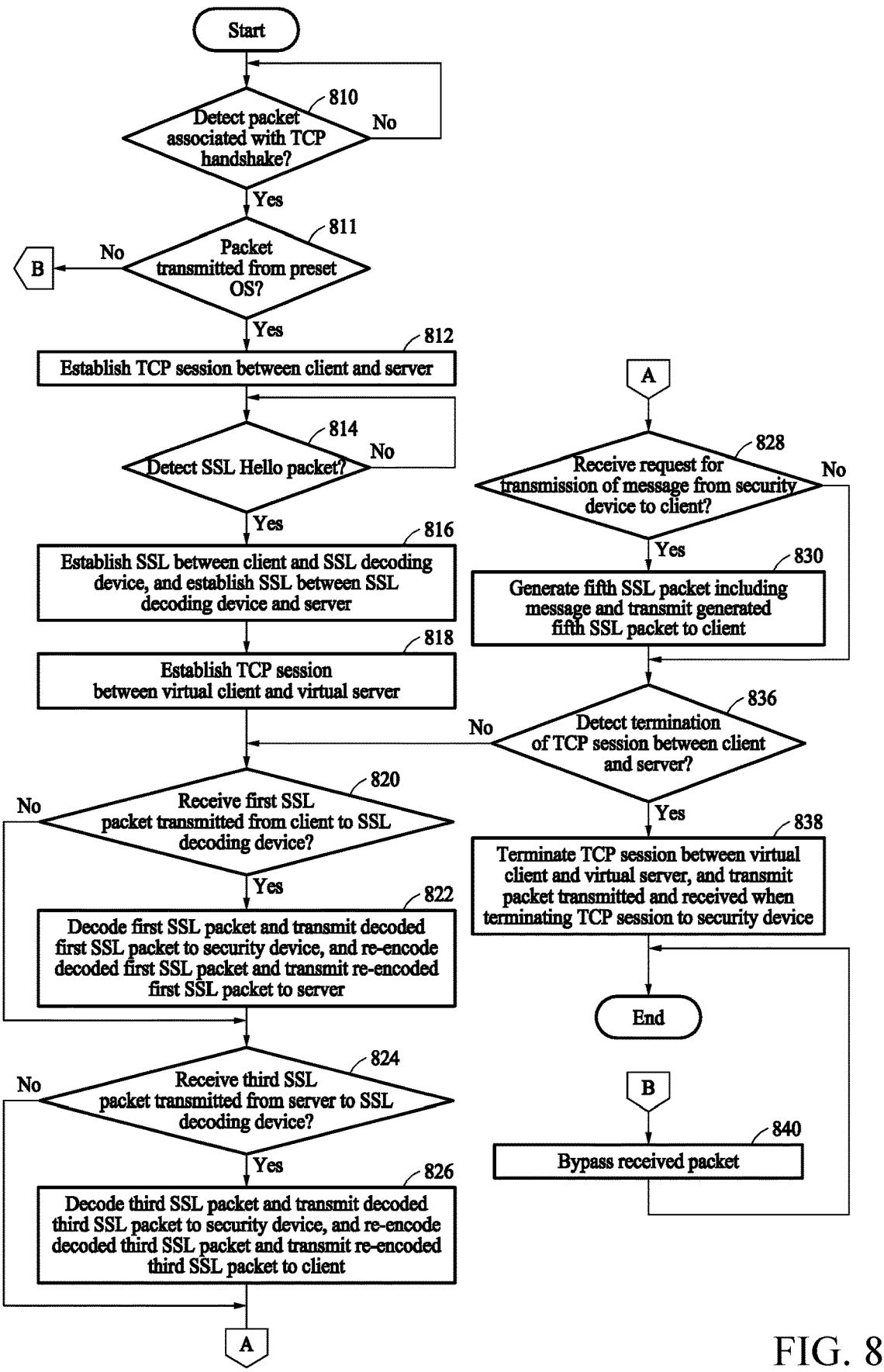
FIG. 8 is a flowchart illustrating another example of how an SSL decoding device processes an SSL packet according to an example embodiment.

FIG. 8 is a flowchart illustrating another example of how an SSL decoding device processes an SSL packet according to an example embodiment.

Referring to FIG. 8, when the SSL decoding device 120 detects a packet associated with a TCP handshake for establishing a TCP session between the client 110 and the server 150 in operation 810, the SSL decoding device 120 verifies whether the packet associated with the TCP handshake is a packet transmitted from a preset OS in operation 811.

Here, to verify whether the packet associated with the TCP handshake is the packet transmitted from the preset OS, the SSL decoding device 120 may verify information on a TTL included in an IP header of the packet. When a value of the TTL is included in a preset range, the SSL decoding device 120 may determine that the client 110 transmitting a packet associated with an SSL handshake operates in the preset OS. For example, in a case in which the OS is Windows, a TTL may decrease by 1 each time passing through a hop starting from 128. In contrast, in a case in which the OS is Android or Linux, a TTL may decrease by 1 each time passing through a hop starting from 256 or 64. In the case in which the OS is Windows, the SSL decoding device 120 may determine that, when the TTL included in the IP header of the received packet has a value from 65 to 128 (or a value from 106 to 127 and from 112 to 127 may be set), the OS is Windows.

In operation 812, when the packet associated with the TCP handshake is the packet transmitted from the preset OS as the result of the verifying in operation 811, the SSL decoding device 120 establishes the TCP session between the client 110 and the server 150.

In operation 814, the SSL decoding device 120 verifies whether a packet associated with an SSL handshake (e.g., an SSL Hello packet) for an SSL connection between the client 110 and the server 150 is detected.

In operation 816, when the packet associated with the SSL handshake is detected as the result of the verifying in operation 814, the SSL decoding device 120 establishes an SSL between the client 110 and the SSL decoding device 120 and establishes an SSL between the SSL decoding device 120 and the server 150. Here, the SSL may be established through the SSL handshake in the same way as described above with reference to FIG. 3.

In operation 818, the SSL decoding device 120 establishes a TCP session between a virtual client corresponding to the client 110 and a virtual server corresponding to the server 150, and transmits a packet transmitted and received for establishing the TCP session between the virtual client and the virtual server to the security device 160.

Here, the SSL decoding device 120 may match and store a 5-tuple of the virtual client corresponding to a 5-tuple of the client 110, and match and store a 5-tuple of the virtual server corresponding to a 5-tuple of the server 150, thereby searching for a corresponding device.

In operation 820, the SSL decoding device 120 verifies whether a first SSL packet transmitted from the client 110 to the SSL decoding device 120 is received.

In operation 822, when the first SSL packet is received as the result of the verifying in operation 820, the SSL decoding device 120 decodes the first SSL packet and transmits the decoded first SSL packet to the security device 160, and re-encodes the decoded first SSL packet and transmits the re-encoded SSL packet to the server 150. Subsequently, the SSL decoding device 120 may perform operation 824.

In operation 824, when the first SSL packet is not received as the result of the verifying in operation 820, the SSL decoding device verifies whether a third SSL packet transmitted from the server 150 to the SSL decoding device 120 is received.

In operation 826, when the third SSL packet is received as the result of the verifying in operation 824, the SSL decoding device 120 decodes the third SSL packet and transmits the decoded third SSL packet to the security device 160, and re-encodes the decoded third SSL packet and transmits the re-encoded third SSL packet to the client 110. Subsequently, the SSL decoding device 120 may perform operation 828.

In operation 828, when the third SSL packet is not received as the result of the verifying in operation 824, the SSL decoding device 120 verifies whether a request for transmission of a message from the security device 160 to the client 110 is received.

In operation 830, when the request for the transmission of the message from the security device 160 to the client 110 is received as the result of the verifying in operation 828, the SSL decoding device 120 generates a fifth SSL packet including the message and transmits the generated fifth SSL packet to the client 110. Subsequently, the SSL decoding device 120 may perform operation 836.

In operation 836, when the request for the transmission of the message from the security device 160 to the client 110 is not received as the result of the verifying in operation 828, the SSL decoding device 120 verifies whether termination of the TCP session between the client 110 and the server 150 is detected.

When the termination of the TCP session between the client 110 and the server 150 is not detected as the result of the verifying in operation 836, the SSL decoding device 120 may return to operation 520 and then perform repeatedly the subsequent operations.

In operation 838, when the termination of the TCP session between the client 110 and the server 150 is detected as the result of the verifying in operation 836, the SSL decoding device 120 terminates the TCP session between the virtual client and the virtual server, and transmits a packet transmitted and received when terminating the TCP session to the security device 160.

In operation 840, when the packet associated with the TCP handshake is not the packet transmitted from the preset OS as the result of the verifying in operation 811, the SSL decoding device 120 bypasses a packet received from the client 110 to allow the packet to the transmitted to the server 150.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A secure socket layer (SSL) decoding method, comprising:
   detecting, by an SSL decoding device, a packet associated with an SSL handshake for an SSL connection between a client and a server after a transmission control protocol (TCP) session between the client and the server is established;
   verifying whether the packet associated with the SSL handshake is a packet transmitted from a preset operating system (OS);
   when the packet associated with the SSL handshake is the packet transmitted from the preset OS, establishing an SSL between the client and the SSL decoding device and establishing an SSL between the SSL decoding device and the server;
   establishing a TCP session between a virtual client corresponding to the client and a virtual server corresponding to the server, and transmitting, to a security device, a packet transmitted and received between the virtual client and the virtual server when establishing the TCP session; and
   when a first SSL packet transmitted from the client to the SSL decoding device is received, decoding the first SSL packet and transmitting the decoded first SSL packet to the security device, and re-encoding the decoded first SSL packet and transmitting the re-encoded first SSL packet to the server,
   when a third SSL packet transmitted from the server to the SSL decoding device is received, decoding the third SSL packet and transmitting the decoded third SSL packet to the security device, and re-encoding the decoded third SSL packet and transmitting the re-encoded third SSL packet to the client,
   wherein the decoding of the third SSL packet and the transmitting of the decoded third SSL packet to the security device, and the re-encoding of the decoded third SSL packet and the transmitting of the re-encoded third SSL packet to the client comprises:
   when the third SSL packet transmitted from the server to the SSL decoding device is received, decoding the third SSL packet;
   generating a second TCP packet including a payload of the decoded third packet and to be transmitted from the virtual server to the virtual client;
   transmitting the second TCP packet to the security device;
   generating a fourth SSL packet including the payload of the decoded third SSL packet; and
   transmitting the fourth SSL packet to the client.

2. The SSL decoding method of claim 1, wherein the verifying of whether the packet associated with the SSL handshake is the packet transmitted from the preset OS comprises:
   verifying information on a time to live (TTL) included in an Internet protocol (IP) header of the packet; and
   when a value of the TTL is included in a preset range, verifying an OS transmitting the packet as the preset OS.

3. The SSL decoding method of claim 1, further comprising:
   when the packet associated with the SSL handshake is not the packet transmitted from the preset OS, bypassing the packet associated with the SSL handshake to be transmitted to the server such that an SSL between the client and the server is established with the SSL decoding device excluded; and
   bypassing an SSL packet transmitted and received between the client and the server from the SSL decoding device.

4. The SSL decoding method of claim 1, wherein the decoding of the first SSL packet and the transmitting of the decoded first SSL packet to the security device, and the re-encoding of the decoded first SSL packet and the transmitting of the re-encoded first SSL packet to the server comprises:
  when the first SSL packet transmitted from the client to the SSL decoding device is received, decoding the first SSL packet;
  generating a first TCP packet including a payload of the decoded first SSL packet and to be transmitted from the virtual client to the virtual server;
  transmitting the first TCP packet to the security device;
  generating a second SSL packet including the payload of the decoded first SSL packet; and
  transmitting the second SSL packet to the server.

5. The SSL decoding method of claim 1, further comprising:
  when termination of the TCP session between the client and the server is detected by the SSL decoding device, terminating the TCP session between the virtual client and the virtual server, and transmitting, to the security device, a packet transmitted and received between the virtual client and the virtual server when terminating the TCP session.

6. The SSL decoding method of claim 1, further comprising:
  when a request for transmission of a message from the security device to the client is received by the SSL decoding device, generating a fifth SSL packet including the message, and transmitting the fifth SSL packet to the client.

7. The SSL decoding method of claim 6, wherein the request for the transmission from the security device to the client is determined when a finish (FIN) packet including the message transmitted from the security device to the client is received, and a reset (RST) packet transmitted from the security device to the server is received.

8. The SSL decoding method of claim 1, wherein the establishing of the TCP session between the virtual client corresponding to the client and the virtual server corresponding to the server, and the transmitting of the packet transmitted and received between the virtual client and the virtual server when establishing the TCP session to the security device comprises:
  matching and storing a 5-tuple of the virtual client corresponding to a 5-tuple of the client, and matching and storing a 5-tuple of the virtual server corresponding to a 5-tuple of the server.

9. A non-transitory computer-readable medium storing instructions that, when executed by a processor, cause the processor to perform a secure socket layer (SSL) decoding method, comprising:
  detecting, by an SSL decoding device, a packet associated with an SSL handshake for an SSL connection between a client and a server after a transmission control protocol (TCP) session between the client and the server is established;
  verifying whether the packet associated with the SSL handshake is a packet transmitted from a preset operating system (OS);
  when the packet associated with the SSL handshake is the packet transmitted from the preset OS, establishing an SSL between the client and the SSL decoding device and establishing an SSL between the SSL decoding device and the server;
  establishing a TCP session between a virtual client corresponding to the client and a virtual server corresponding to the server, and transmitting, to a security device, a packet transmitted and received between the virtual client and the virtual server when establishing the TCP session; and
  when a first SSL packet transmitted from the client to the SSL decoding device is received, decoding the first SSL packet and transmitting the decoded first SSL packet to the security device, and re-encoding the decoded first SSL packet and transmitting the re-encoded first SSL packet to the server,
  when a third SSL packet transmitted from the server to the SSL decoding device is received, decoding the third SSL packet and transmitting the decoded third SSL packet to the security device, and re-encoding the decoded third SSL packet and transmitting the re-encoded third SSL packet to the client,
  wherein the decoding of the third SSL packet and the transmitting of the decoded third SSL packet to the security device, and the re-encoding of the decoded third SSL packet and the transmitting of the re-encoded third SSL packet to the client comprises:
  when the third SSL packet transmitted from the server to the SSL decoding device is received, decoding the third SSL packet;
  generating a second TCP packet including a payload of the decoded third packet and to be transmitted from the virtual server to the virtual client;
  transmitting the second TCP packet to the security device;
  generating a fourth SSL packet including the payload of the decoded third SSL packet; and
  transmitting the fourth SSL packet to the client.

10. The non-transitory computer-readable medium of claim 9, wherein the verifying of whether the packet associated with the SSL handshake is the packet transmitted from the preset OS comprises:
  verifying information on a time to live (TTL) included in an Internet protocol (IP) header of the packet; and
  when a value of the TTL is included in a preset range, verifying an OS transmitting the packet as the preset OS.

11. The non-transitory computer-readable medium of claim 9, further comprising:
  when the packet associated with the SSL handshake is not the packet transmitted from the preset OS, bypassing the packet associated with the SSL handshake to be transmitted to the server such that an SSL between the client and the server is established with the SSL decoding device excluded; and
  bypassing an SSL packet transmitted and received between the client and the server from the SSL decoding device.

12. The non-transitory computer-readable medium of claim 9, wherein the decoding of the first SSL packet and the transmitting of the decoded first SSL packet to the security device, and the re-encoding of the decoded first SSL packet and the transmitting of the re-encoded first SSL packet to the server comprises:
  when the first SSL packet transmitted from the client to the SSL decoding device is received, decoding the first SSL packet;
  generating a first TCP packet including a payload of the decoded first SSL packet and to be transmitted from the virtual client to the virtual server;
  transmitting the first TCP packet to the security device;
  generating a second SSL packet including the payload of the decoded first SSL packet; and
  transmitting the second SSL packet to the server.

13. The non-transitory computer-readable medium of claim 9, further comprising:
  when termination of the TCP session between the client and the server is detected by the SSL decoding device, terminating the TCP session between the virtual client and the virtual server, and transmitting, to the security device, a packet transmitted and received between the virtual client and the virtual server when terminating the TCP session.

\* \* \* \* \*